Oct. 16, 1951     N. ECKLES     2,571,349
TRAILER HITCH LOCK
Filed Oct. 17, 1949
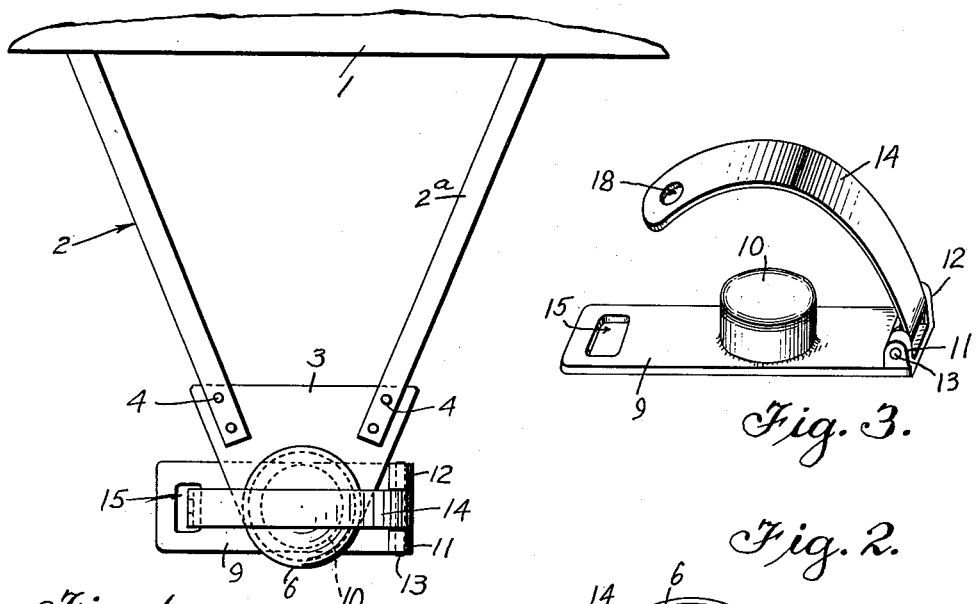
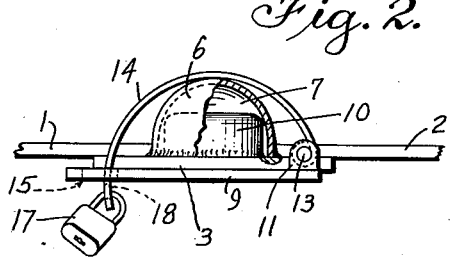
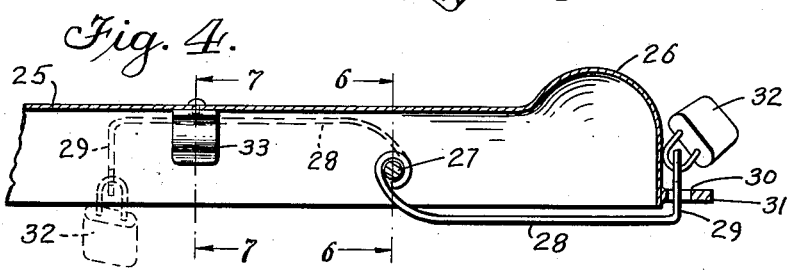
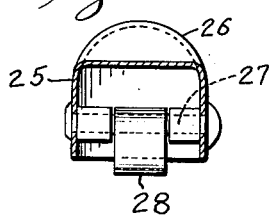
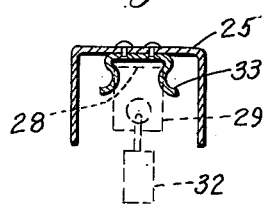
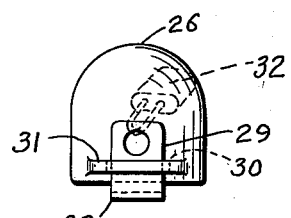
INVENTOR:
Noble Eckles
BY
O. D. Martin
ATTORNEY Patented Oct. 16, 1951

2,571,349

UNITED STATES PATENT OFFICE 2,571,349

TRAILER HITCH LOCK

Noble Eckles, Glendale, Calif., assignor of one-half to Robert B. Eckles, San Francisco, Calif.

Application October 17, 1949, Serial No. 121,820

4 Claims. (Cl. 280—33.17)

This invention relates to trailer hitches such as used to connect trailers with passenger automobiles and light trucks and has particular reference to means for closing the entrance to the socket of the tongue member extending from the trailer after the trailer has been disconnected from the traction vehicle.

To this end the invention resides in the combinations set forth in the following detailed description and reference is invited to the accompanying drawing in which a preferred form of the invention is illustrated.

In the drawing:

Fig. 1 is a fragmentary plan view of the front end of a trailer showing the socket member of a trailer hitch forwardly projecting therefrom and the device of the invention mounted in position on the socket member thereof;

Fig. 2 is an end view of the device of Fig. 1;

Fig. 3 is a perspective view of the device as it appears when removed from the socket member of the trailer;

Fig. 4 is a side elevational view taken substantially through the longitudinal center of the front end of the trailer hitch tongue showing another embodiment of the device of the invention embodied therein;

Fig. 5 is a substantially corresponding end view of this trailer hitch and closure combination;

Fig. 6 is a sectional view taken on line 6—6 of Fig. 4 in the direction of the arrow 6; and Fig. 7 is a view taken on line 7—7 of Fig. 4 in the direction of the arrows 7.

Referring in the first instance to Fig. 1, it is noticed that the numeral 1 designates the front end of a trailer to which a well known type of support frame for the socket member of a trailer hitch is secured. This frame consists of bars 2a, 2 which converge forwardly to meet the side edges of a plate 3, on the surface of which they are rigidly anchored, as by rivets or bolts 4. From the plate rises a conventional dome-shaped socket member 6 within the recess 7 of which the ball of the traction vehicle drawbar is locked in position to connect the trailer to the vehicle, all as usual in practice.

In the illustration, the ball has been withdrawn and the socket closing device of the invention clamped in position in place thereof. This device includes a base plate 9 having a member 10 rising from the top surface thereof to form a plug of a size to fit snugly within the socket 7. From one end of the plate rise lugs 11, 12 to support therein a pivotal rod 13. A strap 14 is mounted for rotation on this rod and it is shown curved to fit over the socket member 6, substantially as indicated in Fig. 2. In the opposite end of the base plate is cut a perforation 15 through which the outer end of the strap is inserted to secure the device in position on the socket member, whereupon means such as a padlock 17 is caused to engage a perforation 18 of the strap to lock the device firmly in position on the socket member. This completes the combination of the invention.

While the shape and construction of the socket support frame illustrated in the drawing is well known and much used, it is to be understood that many other types of socket support frames and trailer hitch tongues are on the market. Also that the shape and proportions of my socket closing device may be varied to suit particular socket members, but the general outline and the principle of operation of my device will in all cases remain as above described. So long as the plug 10 remains seated in the socket and the padlock holds the strap in closed position, it is not possible to detach the device from the socket member.

While in the foregoing I have described a socket closure attachable to any conventional socket member of a trailer, it may be preferred to construct a special socket member including the socket closing device as a permanent part thereof. Such construction is indicated in Figs. 4 to 7, in which the tongue member 25 and the socket head 26 are formed into the shape shown from a sheet of suitable material and of a size to fit snugly over the ball member of a vehicle drawbar.

A rod 27 extends horizontally across the member rotatably to support thereon a strap 28, the outer end of which forms an upwardly bent tongue 29 riding in the perforation 30 of a lug 31 projecting from the end of a socket member, thereby to close the entrance thereto. When a padlock 32 is applied to the end of the tongue, as indicated in Fig. 4, it is seen that it will not be possible to gain entrance to the socket member for insertion of a drawbar ball until the padlock is again removed. Because the strap 28 forms part of the tongue, it is in this case possible to leave out the plug 10.

When the strap is not in use, it may be swung back within the tongue member, substantially as indicated in dotted outline in Fig. 4. A suitable clip 33 is shown mounted within the member 25 of a shape to receive therein the strap 28 and to maintain it tightly in this position until it is again required to close the socket of the tongue member.

It is seen from the foregoing description that I have provided a simple and inexpensive socket closing device which is convenient to operate and will securely maintain the socket closed to prevent attachment to a draw bar ball until the padlock is removed. But while I have illustrated and described preferred forms of the invention, this is not intended to constitute a limitation thereof, but right is reserved to embody further modifications within the scope of the claims hereto appended.

I claim:

1. A device for closing the socket of a trailer hitch member comprising, a support having thereon a plug of a size snugly to fit within the socket of the trailer hitch member, a strap pivotally hung on said support and movable over the trailer hitch member together with the support completely to enclose the socket thereof, and means for interlocking the support and the strap.

2. A device for closing the socket of a trailer hitch member comprising, a support having thereon a plug of a size snugly to fit within the socket of the trailer hitch member, and an aperture at one end thereof, a strap pivotally hung on said support at the other end thereof, said strap having a perforation at the outer free end thereof, the strap being movable over the trailer hitch member to cause the end thereof to pass through the aperture of the support, and means engaging the perforation of the strap to lock the parts in position about the socket of the trailer hitch member.

3. A device for closing the socket of a trailer hitch member comprising, a detachable support having thereon a plug of a size snugly to fit within the socket of the trailer hitch member, a strap pivotally hung on said support and movable over the trailer hitch member together with the support completely to enclose the socket thereof and means for interlocking the support and the strap.

4. A device for closing the socket at the end of a trailer hitch member, said device comprising, a support having thereon a plug of a size to fit snugly within the socket of said member, a strap pivotally hung on said support at one end thereof and transversely extending over the end of the trailer hitch member to the other end of the support, and means interlocking the end of the strap with the support.

NOBLE ECKLES.

REFERENCES CITED

The following references are of record in the file of this patent:

UNITED STATES PATENTS

| Number | Name | Date |
|---|---|---|
| 163,359 | Chambers et al. | May 18, 1875 |
| 1,923,767 | Weldon | Aug. 22, 1933 |
| 2,139,970 | Moore | Dec. 13, 1938 |
| 2,142,365 | McKee | Jan. 3, 1939 |
| 2,438,749 | Harrer | Mar. 30, 1948 |
| 2,481,139 | Miller | Sept. 6, 1949 |

FOREIGN PATENTS

| Number | Country | Date |
|---|---|---|
| 460,462 | Great Britain | Jan. 28, 1937 |